US010420685B2

(12) United States Patent
Anandasabapathy et al.

(10) Patent No.: US 10,420,685 B2
(45) Date of Patent: Sep. 24, 2019

(54) MOBILE CLINICS

(71) Applicant: Baylor College of Medicine, Houston, TX (US)

(72) Inventors: Sharmila Anandasabapathy, Houston, TX (US); Sarah Michel, Houston, TX (US); Caroline Popper, Baltimore, MD (US)

(73) Assignee: Baylor College of Medicine, Houston, TX (US)

( * ) Notice: Subject to any disclaimer, the term of this patent is extended or adjusted under 35 U.S.C. 154(b) by 78 days.

(21) Appl. No.: 15/523,126

(22) PCT Filed: Nov. 11, 2015

(86) PCT No.: PCT/US2015/060169
§ 371 (c)(1),
(2) Date: Apr. 28, 2017

(87) PCT Pub. No.: WO2016/077466
PCT Pub. Date: May 19, 2016

(65) Prior Publication Data
US 2017/0333267 A1 Nov. 23, 2017

Related U.S. Application Data

(60) Provisional application No. 62/078,924, filed on Nov. 12, 2014, provisional application No. 62/237,138, filed on Oct. 5, 2015.

(51) Int. Cl.
*A61G 3/00* (2006.01)
*A62B 31/00* (2006.01)
(Continued)

(52) U.S. Cl.
CPC ............. *A61G 3/001* (2013.01); *A62B 31/00* (2013.01); *B60P 3/32* (2013.01); *E04H 3/08* (2013.01)

(58) Field of Classification Search
CPC .......... A61G 3/001; A62B 31/00; B60P 3/32; E04H 3/08
See application file for complete search history.

(56) References Cited

U.S. PATENT DOCUMENTS 4,181,347 A 1/1980 Clark et al.
4,213,303 A 7/1980 Lane
(Continued)

OTHER PUBLICATIONS

International Search Report and Written Opinion, International Patent Application No. PCT/US2015/060169, dated Feb. 26, 2016.
(Continued)

*Primary Examiner* — D Glenn Dayoan
*Assistant Examiner* — Melissa A Black
(74) *Attorney, Agent, or Firm* — Saul Ewing Arnstein & Lehr LLP; Kathryn Dole; Brian R. Laundry

(57) ABSTRACT

One aspect of the invention provides a mobile clinic including: an intermodal container defining at least a first opening and a second opening; a partition wall located within the intermodal container, the partition wall separating the intermodal container into an anteroom and a treatment room; and an access control device programmed to prevent passage from the anteroom into the treatment room until a user's donning of personal protective equipment is verified. Another aspect of the invention provides a collapsible structure including: a rigid base; a rigid roof; one or more collapsible walls extending between the floor and the base; and an erector system comprising four cross-bars. Another aspect of the invention provides a crate including: a bottom panel; a top panel; and a plurality of walls, wherein at least two of said plurality of wails including one or more conduits.

7 Claims, 17 Drawing Sheets

- Modular
- Each unit can run independently or be connect to other units
- Portable

(51) Int. Cl.
*B60P 3/32* (2006.01)
*E04H 3/08* (2006.01)

(56) References Cited

U.S. PATENT DOCUMENTS

| | | | |
|---|---|---|---|
| 4,425,978 | A | 1/1984 | Star |
| 4,570,733 | A | 2/1986 | Star |
| 4,981,319 | A * | 1/1991 | Gerzeny ............... B60J 7/165 |
| | | | 296/165 |
| 5,727,353 | A | 3/1998 | Getz et al. |
| 6,179,358 | B1 | 1/2001 | Hirayama et al. |
| 6,766,623 | B1 | 7/2004 | Kalnay |
| 7,644,970 | B2 | 1/2010 | Chui et al. |
| 8,208,681 | B2 | 6/2012 | Heller et al. |
| 2005/0131738 | A1 | 6/2005 | Morris et al. |
| 2007/0107321 | A1 * | 5/2007 | Sarine ............... E04B 1/34305 |
| | | | 52/71 |
| 2007/0132262 | A1 | 6/2007 | Sun et al. |
| 2007/0212673 | A1 | 9/2007 | King et al. |
| 2008/0020361 | A1 | 1/2008 | Kron et al. |
| 2010/0064601 | A1 | 3/2010 | Napier |
| 2010/0175694 | A1 | 7/2010 | James et al. |
| 2011/0047891 | A1 | 3/2011 | Andretich et al. |
| 2012/0035279 | A1 | 2/2012 | Miller et al. |
| 2012/0077429 | A1 | 3/2012 | Wernimont et al. |
| 2013/0282609 | A1 | 10/2013 | Au et al. |

OTHER PUBLICATIONS

"Biologics Modular—Modular Biopharmaceutical Facilities >> Our Products", http://www.biologicsmodular.com/main/our-products/, downloaded Nov. 7, 2014.

"Container Clinic Headed for Haiti!—Clinic In A Can", http://www.clinicinacan.org/container-hospital-headed-for-haiti/, downloaded Nov. 7, 2014, 1-4.

"Sanosil International manufactures disinfecting biocide formulas for man . . . ", http://sanosilinternational.com/products#Sanosil-HaloMist, 1-4, downloaded Nov. 7, 2014.

Americares, "The Power of Partnership: Working Together to Restore Maternal and Pediatric Health in Haiti", Nov. 2010.

Gruver, "Hospitals for Hope converts shipping containers into clinics", http://www.kansas.com/news/local/article1021575.html, 1-3, downloaded Nov. 7, 2014.

Heck, "Wichita nonprofit shipping two portable medical clinics overseas", http://www.bizjournals.com/wichita/news/2013/03/12/wichita-nonprofit- . . . , Mar. 1-2, 2013.

Hersh, "USAID funds Ebola 'smart pod' project", http://www.federaltimes.com/story/government/acquisition/contracts/201 . . . , Feb. 1-2, 2015.

Hines, "A&M-affiliated company could be tasked with Ebola-drug production", http://www.houstonchronicle.com/business/medical/article/A-M-affiliate . . . , Oct. 1-5, 2014.

HKS Architects, "Innovative HKS Infection Control Concept Highlighted at International Ebola Crisis Summit", http://www.hksinc.com/insight/innovative-hks-infection-control-concept-h . . . , Feb. 1-2, 2015.

Iyengar, et al., "The GuideView System for Interactive, Structured, Milti-modal Delivery of Clinical Guidelines", The University of Texas, downloaded Nov. 11, 2014.

Maynor, "Clinic in a Can—and the Man Who Made It Happen", International Humanitarian PA of the Year, AAPA News, Jul. 2005.

Neuhauser, "The Future of Mobile Medicine: Shipping Containers to Fight Ebola", http://health.usnews.com/health-news/hospital-of-tomorrow/articles/2015 . . . , Feb. 1-4, 2015.

Ryan, "Clinic in a Can leads Ebola crisis response in Wichita", http://www.kansas.com/news/local/article3193714.html, Oct. 1-4, 2014.

Ryan, "Local nonprofit to send 2 'Clinic in a Can' facilities overseas", http://www.kansas.com/news/business/article1110803.html, Mar. 1-2, 2013.

Ryan, "Wesley isolation unit could treat Ebola patients", http://www.kansas.com/news/local/article3325574.html, Oct. 1-4, 2014.

Stanton, "G-CON's containment PODs launched in response to Ebola crisis", http://www.biopharma-reporter.com/Bio-Developments/G-CON-s-conta . . . , Aug. 1-3, 2014.

Usaid, "Ebola 'Smart' Pod (ESP)—Fighting Ebola: A Grand Challenge for Development", http://www.ebolagrandchallenge.net/ebola-smart-pod, 1-3, downloaded Aug. 31, 2015.

Usaid, "Ebola 'Smart' Pod (ESP)—Fighting Ebola: A Grand Challenge Announces Additional Nominess for Awards", http:://www.ebolagrandchallenge.net/ebola-smart-pod, 1-3, downloaded Aug. 31, 2015.

Usaid, "United States Announces Additional Results in Grand Challenge to Fight Ebola", https://www.usaid.gov/news-information/press-release/feb-11-2015-unit. . . , Feb. 1-4, 2015.

Wikipedia, "Shipping container clinic", http://en.wikipedia.org/wiki/Shipping_container_clinic, 1-2, downloaded Nov. 7, 2014.

* cited by examiner

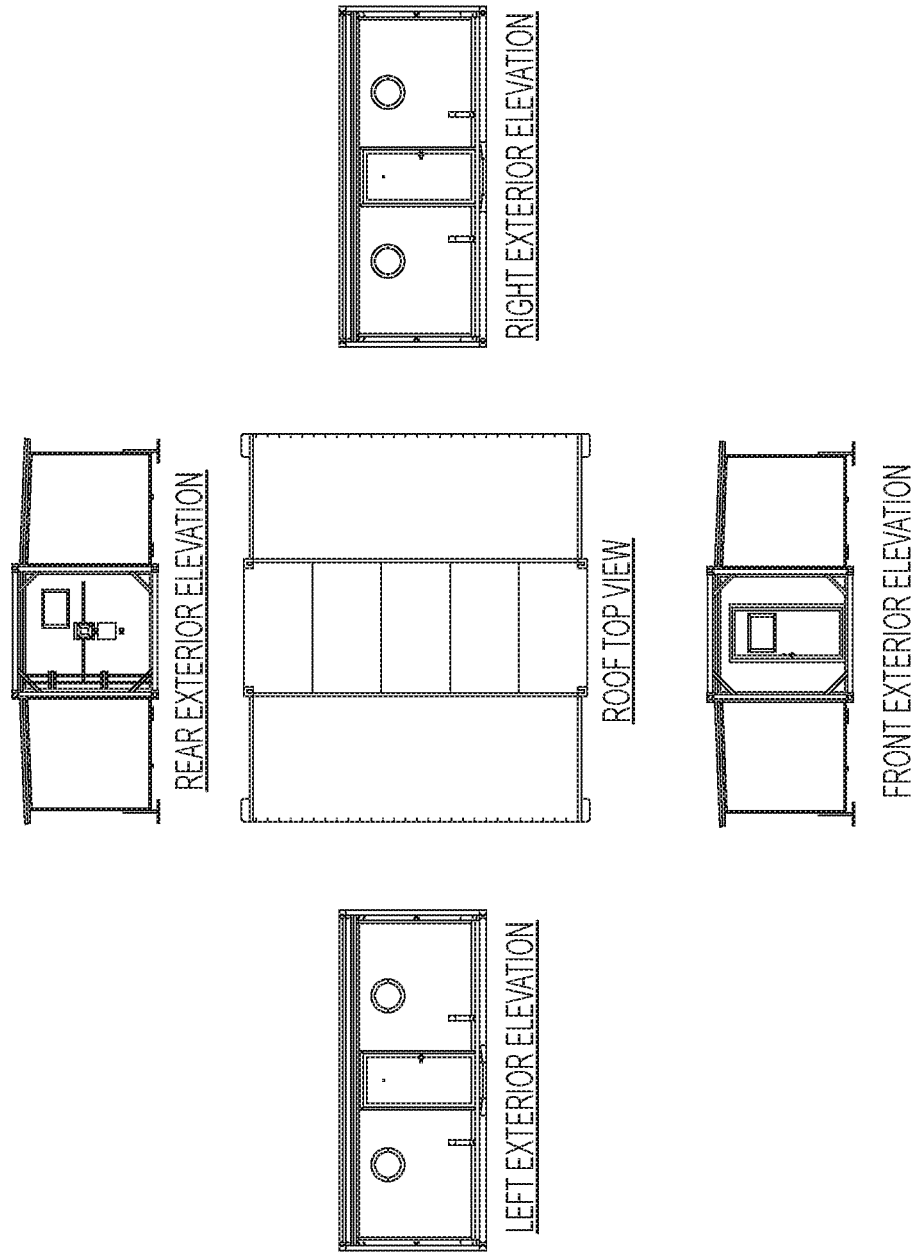

MOBILE CLINICS

CROSS-REFERENCE TO RELATED APPLICATIONS

This application is a national phase application of International Patent Application No. PCT/US2015/060169, filed Nov. 11, 2015, which claims priority to U.S. Provisional Patent Application Ser. Nos. 62/078,924, filed Nov. 12, 2014, and 62/237,138, filed Oct. 5, 2015. The entire content of each of these applications is hereby incorporated by reference herein.

BACKGROUND OF THE INVENTION

The 2014/2015 West African Ebola outbreak escalated since March of 2014 into the largest Ebola epidemic in. Although many experts predicted the infection would be controlled by now, the burden of disease continues to rise due to a variety of operational challenges, including inadequate medical facilities, lack of trained personnel, extensive and complex infection control procedures, and cumbersome personal protective equipment (PPE). Despite published CDC guidelines on Ebola Virus Disease (EVD), consistent protocol implementation in the field has been challenging.

SUMMARY OF THE INVENTION

One aspect of the invention provides a mobile clinic including: an intermodal container defining at least a first opening and a second opening; a partition wall located within the intermodal container, the partition wall separating the intermodal container into an anteroom and a treatment room; and an access control device programmed to prevent passage from the anteroom into the treatment room until a user's donning of personal protective equipment is verified.

This aspect of the invention can have a variety of embodiments. The mobile clinic can further include a computing device programmed to receive data regarding patient health or medical supply usage and transmit the data to a location outside of the mobile clinic. The computing device can be further programmed to receive feedback from a remote location based on the data.

The mobile clinic can further include a computing device programmed to execute one or more training programs for healthcare professionals or member of a local community. The one or more training programs can display culturally-appropriate caricatures and graphics.

Another aspect of the invention provides a collapsible structure including: a rigid base; a rigid roof; one or more collapsible walls extending between the floor and the base; and an erector system comprising four cross-bars.

This aspect of the invention can have a variety of embodiments. The rigid base can be made of a material selected from the group consisting of: wood, metal, wood composite, fiber composite, plastic composite, bamboo mat, vinyl resin, phenolic resin, epoxy resin, unsaturated polyester resin, polyimide resin, and laminate.

The rigid roof can be made of a material selected from the group consisting of: wood, metal, wood composite, fiber composite, plastic composite, bamboo mat, vinyl resin, phenolic resin, epoxy resin, unsaturated polyester resin, polyimide resin, and a urethane polymer.

The collapsible walls can be made of a light-weight material selected from the group consisting of: canvas, fabric, woven fabric, netting, water-proof fabric, breathable fabric, textile, mesh, mosquito net, high-density polyethylene fibers, polyester, high-tenacity polyester, a urethane polymer, and nylon.

The four cross-bars can be tensioned with a spring mechanism. The four cross-bars can be configured to engage with the roof to keep the collapsible structure in an erect position. The rigid roof or rigid base can include a rail or slide guide adapted and configured to allow for horizontal sliding of the four cross-bars.

The collapsible structure can be further configured and adapted to be stacked on a plurality of additional collapsible structures. The collapsible structures can be stacked together by one or more selected from the group consisting of pins, angle clips, frame ties, strap ties, braces, brackets, hasps, latches, and hinges.

The collapsible structure can be further configured and adapted for linking to a plurality of additional collapsible structures.

The collapsible structure can further include a computing device programmed to: receive data regarding patient health or medical supply usage; and transmit the data to one or more locations within or outside of the collapsible structure. The computing device can be further programmed to provide clinical decision support. The computing device can be further programmed to support one or more telehealth applications selected from the group consisting of: teleconsulting, telemedicine, and teleseminars.

The collapsible structure can further include one or more communications devices adapted and configured to facilitate communications between one or more additional collapsible structures.

Another aspect of the invention provides a collapsible structure including: a rigid base; a rigid roof; one or more collapsible walls extending between the rigid base and the rigid roof; and opposing pairs of cross-bars adapted and configured for engagement with the rigid base and the rigid roof, wherein at least one end of each cross-bar is moveable to an increased angle with respect to the rigid base or the rigid roof in order to raise the rigid roof relative to the rigid base.

Another aspect of the invention provides a crate including: a bottom panel; a top panel; and a plurality of walls, wherein at least two of said plurality of walls including one or more conduits.

This aspect of the invention can have a variety of embodiments. One or more of the plurality of walls can be configured to engage with each other, the bottom panel, or the top panel by a connector selected from the group consisting of: an angle clip, a frame tie, a strap tie, a brace, a bracket, a hasp, a latch, and a hinge.

The plurality of walls can be adapted and configured to form a patient treatment wall. The plurality of walls can further include a pegboard or track wall system adapted and configured to hang one or more selected from the group consisting of: an intravenous fluid bag, medication, and medical equipment.

The one or more conduits can be adapted and configured to engage with conduit in an adjacent wall by a gasket or a coupling. The one or more conduits can be adapted and configured to support one or more selected from the group consisting of: an electrical system, an oxygen system, a suction system, and a lighting system.

The plurality of walls can be adapted and configured to be linked with additional patient treatment walls.

Another aspect of the invention provides a solar purification system including: a moveable Fresnel lens; a controller; and an actuator adapted and configured to move the Fresnel lens to track sunlight and direct the sunlight to a designated location.

This aspect of the invention can have a variety of embodiments. The solar purification system can further include a frame adapted and configured to hold the moveable Fresnel lens, the controller, and the actuator. The Fresnel lens can be mounted on one or more rails.

The solar purification system can further include one or more sealed water containers.

The one or more sealed water containers can include a thermistor programmed to sense temperature. The thermistor can measure temperature inside a sealed water container and communicate a measured temperature to a controller. The controller can be programmed to receive water temperature measurements from the thermistor and control the actuator to adjust the Fresnel lens to track sunlight and optimize heating.

A motor can be mounted inside a stand below the Fresnel lens. The motor can be adapted and configured to rotate a plurality of sealed water containers to replace a new sealed water container in place of a treated sealed water container.

The solar purification system can further include one or more solar arrays adapted and configured to power at least one of the controller, the thermistor, the motor, and the actuator.

The solar purification system can be collapsible.

The solar purification system can further include a reusable filter adapted and configured to pretreat water and eliminate large particulates.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views and wherein.

DEFINITIONS

Figure 1:
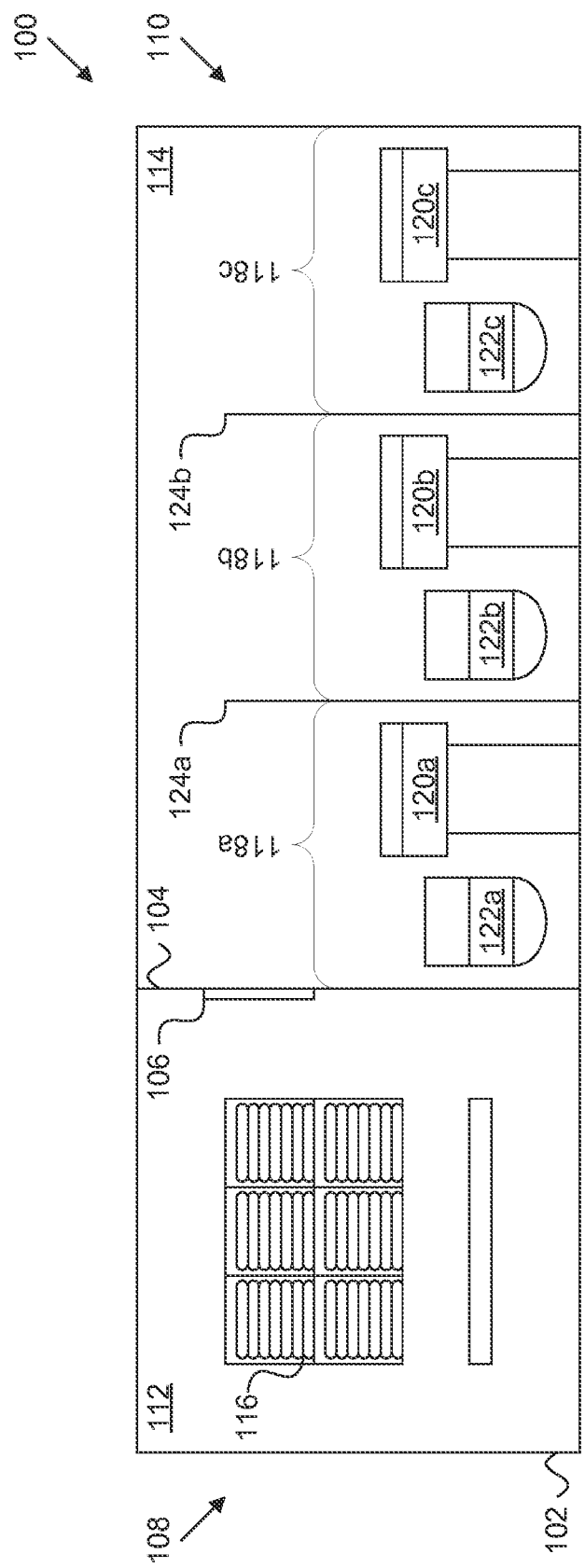
FIG. 1 depicts a vertical cross-section of a mobile clinic according to an embodiment of the invention.

The instant invention is most clearly understood with reference to the following definitions:

As used herein, the singular form "a," "an," and "the" include plural references unless the context clearly dictates otherwise.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Mobile Clinics

Aspects of the invention provide mobile clinics that can be quickly transported (e.g., via truck, rail, aircraft, and/or ship) and/or prepositioned for use during a time of medical need.

One aspect of the invention provides a mobile clinic 100 including an intermodal container 102, a partition wall 104 located within the intermodal container 102, and one or more access control devices 106.

The intermodal container 102 (also known as a freight container, ISO container, shipping container, hi-cube container, ConEx box, or sea can) can be a standardized reusable steel box. Typical lengths include about 20 feet, about 40 feet, about 48 feet, and about 53 feet. Typical widths include about 8 feet. Typical heights include about 8 feet, about 8.5 feet, and about 9.5 feet. The intermodal container 102 can include a first opening 108 and a second opening 110. For example, the loading doors traditionally found on one end of an intermodal container 102 can constitute the first opening 108, while a second opening 110 can be a door fabricated within the wall on the opposite end of the intermodal container 102.

Intermodal containers 102 are available from a variety of sources such as SpaceMax, Inc. of New Braunfels, Tex. The SM series (e.g., models SM100, SM200, and SM10) available from SpaceMax include side container walls that pivot up and are supported by walls and a floor that pivot out from inside the container to provide a broader sheltered footprint.

The intermodal container 102 can be modified to more comfortably accommodate healthcare personnel and patients in the field. For example, steel studs, hook-and-loop fasteners (e.g., those available under the VELCRO® trademark from Velcro Industries B.V. of the Netherlands Antilles), and the like can be installed to receive wall board (e.g., plywood or oriented strand board) and receive equipment such as cameras, intravenous (IV) drip bags, and the like. The walls can be insulated (e.g., with open- or closed-cell foams such as polyurethanes or isocyanates). In one embodiment, the walls, floors, and/or ceilings are finished with a covering that is durable, resistant to fluids, and easy to sterilize. Suitable coverings include plastic wall panels, linoleum tile, antimicrobial flooring (e.g., epoxy resins), and the like.

The partition wall 104 can be fabricated from the same or similar materials as the interior walls described above. Partition wall 104 divides the intermodal container 102 into an anteroom 112 and a treatment room 114. Healthcare personnel can utilize the anteroom 112 to don personal protective equipment 116, which can be pre-stocked in the anteroom 112 prior at the time of manufacture, prepositioning, delivery, and/or deployment.

The partition wall 104 can include one or more windows (on either the wall, door, or both) that permit healthcare providers to monitor the treatment room 114 without entering the treatment room 114. A pass-through, transparent window on the wall or door can allow supplies to be passed into the treatment room 114 without direct entry.

The anteroom 112 can include one or more access control devices 106 programmed to prevent passage of healthcare personnel into the anteroom 112 unless the user authenticates and/or authorizes themselves (e.g., via one or more of a keypad, a camera, a biometric scanner, and the like) and/or prevent passage of healthcare personnel from the anteroom 112 to the treatment room 114 until a user's donning of personal protective equipment 116 is verified and the user authenticates and/or authorizes themselves (e.g., via one or more of a keypad, a camera, a biometric scanner, and the like). For example, the access control device 106 can include a camera that can capture images or video of the user donning their PPE 116 and can either automatically detect (e.g., through image analysis) or through video communication with a remote monitor whether the user properly donned their PPE 116.

The access control device 106 can also prohibit opening of a door between the anteroom 112 and the treatment room 114 if a door from the anteroom 112 to the outside of the intermodal container 102 is open.

The treatment room 114 can include one or more (e.g., 1, 2, 3, 4, 5, 6, 7, 8, and the like) bays 118 for isolating and treating potentially infected individuals. Each bay 118 can include a separate bed 120, a separate lavatory, and/or a separate sink. In some embodiments, the lavatory and sink can be a combined lavatory-sink unit 122 such as those sold by Acorn Engineering Company, Inc. of City of Industry, Calif.

Each bay 118 can be separated from each other by a partition 124, which can extend from floor to ceiling. In one embodiment, the partition 124 is a substantially transparent partition that facilitates monitoring of each bay 118 from throughout the treatment room 114 or even the anteroom 112. Suitable transparent materials include glass or acrylic glass (poly(methyl methacrylate) or PMMA). Acrylic glass is available under the LUCITE® and PERSPEX® trademarks from Lucite International, Inc. of Cordova, Tenn.

A centralized station or island 126 can include a repository of medical supplies, one or more computing devices, and the like. The computing devices can be coupled, e.g., via wired or wireless communication such as WI-FI, BLUETOOTH, 3G, 4G LTE, and the like, with another computer and/or network outside of the mobile clinic 100. Such computing devices(s) and connection(s) can facilitate the collection, storage, and/or transmission of data about patients and medical supplies to consulting physicians and health organizations that can be located in other countries without the risk of transmission posed by carrying paper charts out of the mobile clinic 100 and can also allow consulting physicians to provide suggested courses of treatment to the healthcare professionals without leaving the mobile clinic 100. In one embodiment, patient data can be transmitted to another computer outside of the mobile clinic 100 for storage, processing, analysis, and/or generation of feedback and/or control signals for personnel and apparatus inside the mobile clinic 100. This data can be persistently stored for later use in researching, measuring, and evaluating patients and/or care systems. In one embodiment, bar and/or QR codes can be utilized to associate data, samples, medical supplies, and the like with particular patients. Computing devices also can serve as a "call button" for patients or healthcare providers in the "hot zone" to communicate and emergency contact providers in the 'cold zone".

Figure 4A:
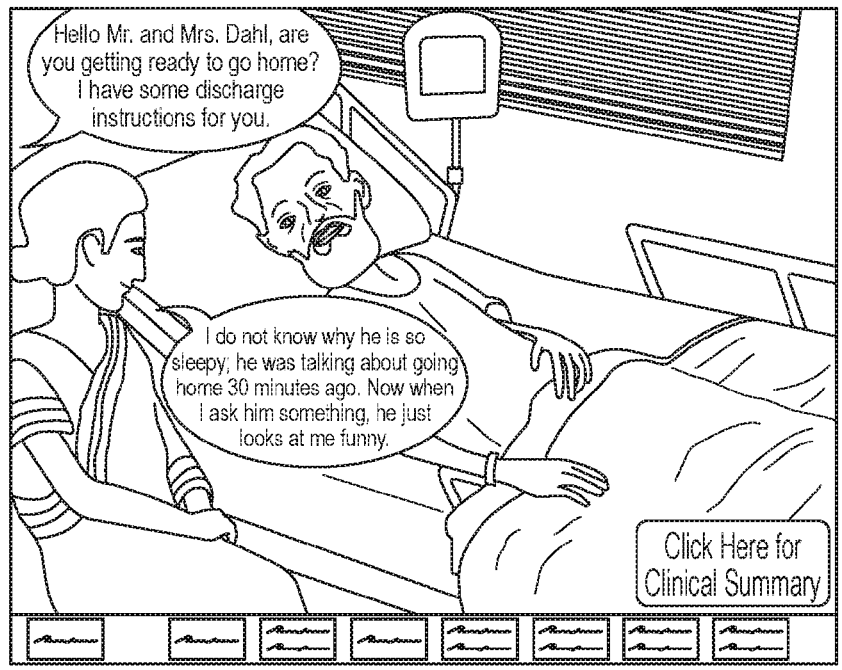
FIGS. 4A and 4B depicts screenshots of training software according to an embodiment of the invention.
Figure 4B:
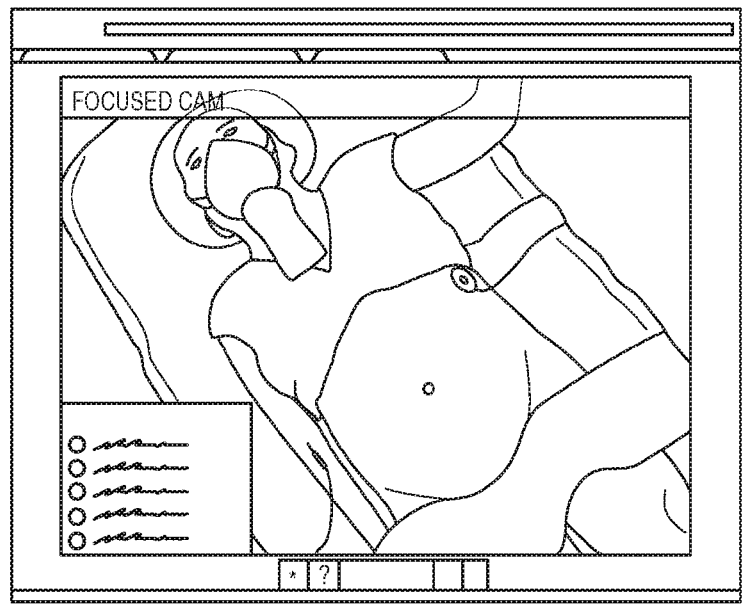
Figure 10A:
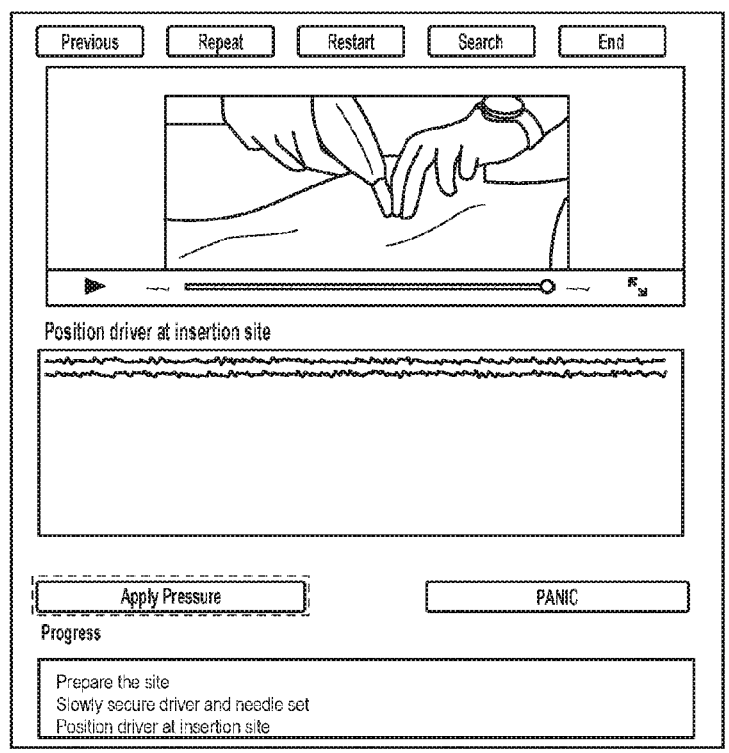
FIGS. 10A and 10B depict screenshots for medication administration and donning of Personal Protective Equipment (PPE) according to an embodiment of the invention.
Figure 10B:
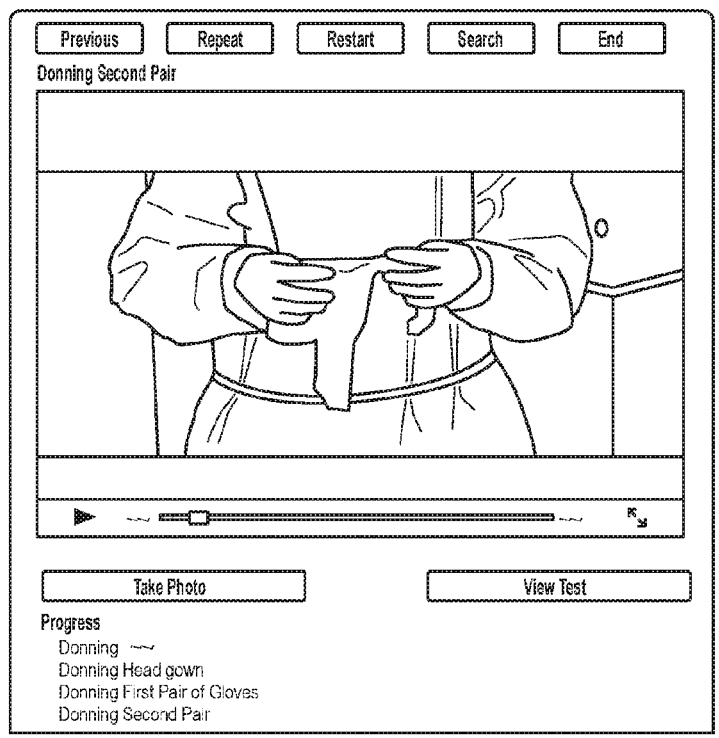
Figure 11B:
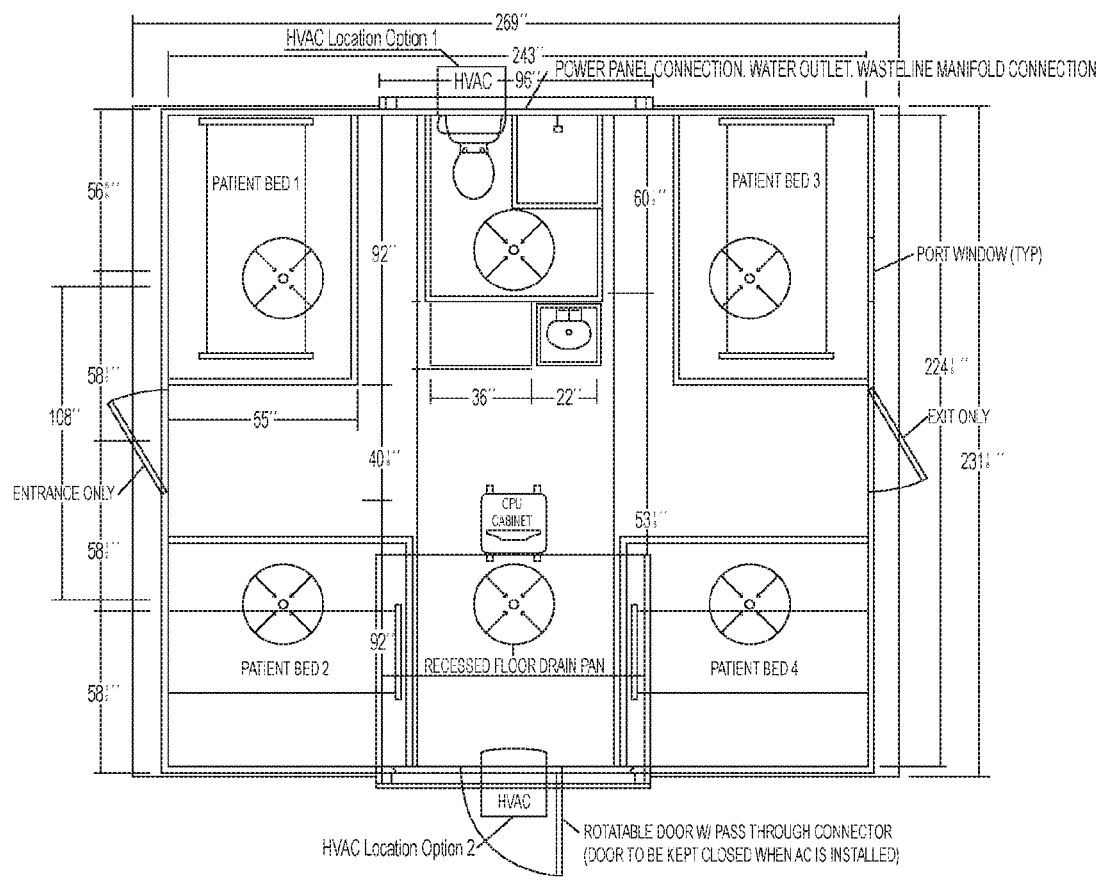
FIG. 11 provides several views of a mobile clinic according to an embodiment of the invention.

The computers/tablets described herein can include various training programs for healthcare professionals and members of the community. Suitable programs are available from StepStoneMed, Inc. and screenshots of other STEPSTONE™ programs are depicted in FIGS. 4A and 4B. Other suitable programs include GUIDEVUE® as described in M. Sririam Iyengar et al., "GuideVue: Structured Multi-modal Delivery of Clinical Guidelines," in *Proc. AMIA Ann. Sym.* (2005). Screenshots of the GUIDEVUE® program are provided in FIGS. 10A and 10B.

The mobile clinic can include an HVAC system sufficient to maintain the mobile clinic 100 at an acceptable temperature, even when the mobile clinic 100 is placed in a warm environment. In some embodiments, the HVAC system can facilitate negative room pressure within the treatment room 114 in order to prevent cross-contamination. Additionally or alternatively, other infection control air purification systems such as the Health Risk Management System (HRMS) systems available from Infection Solution of Houston, Tex. can be installed within the mobile clinic to reduce infection risks.

All outflows from lavatories, sinks, floor drains, and the like can be collected into a single vessel for storage and treatment.

Mobile clinic 100 can include a disinfecting apparatus adapted and configured for disinfecting the inside of the mobile clinic 100 after use. Such a system can be a conventional disinfection system that can be placed in anteroom 112 and/or treatment room 114 when disinfection is desired or can be integrated into the walls of the mobile clinic 100 (e.g., with a plurality of nozzles distributed throughout the mobile clinic 100). Suitable disinfection systems include hydrogen peroxide and silver foggers such as those sold under the SANOSIL™ HALO™ trademark by Med Effect, Inc. of San Diego, Calif. and chlorine dioxide generators such as those available from ClorDiSys Solutions, Inc. of Lebanon, N.J. and those described in U.S. Pat. Nos. 7,534,398; 8,119,071; 8,262,986; and 8,282,891.

Other components can be provided or incorporated within the mobile clinic 100 to suit a variety of uses. For example, an autoclave (e.g., a solar-powered autoclave) can be provided to support various medical procedures.

The mobile clinic 100 can be powered in whole or in part by mains electricity, solar panels, batteries, fuel cells, generators, and the like. In some embodiments, electricity from all sources can be routed through a power manager that can allocate, prioritize, convert, and/or condition various power sources in order to meet user needs. Suitable power managers are described in U.S. Pat. Nos. 8,633,619; 8,638,011; and 8,775,846 and available from Protonex Technology Corporation of Southborough, Mass. In other embodiments, one or more devices within the mobile clinic can have a dedicated power source. For example, Hilos Ventures of Cheyenne, Wyo. provides solar-powered air conditioners and refrigerators.

Figure 2:
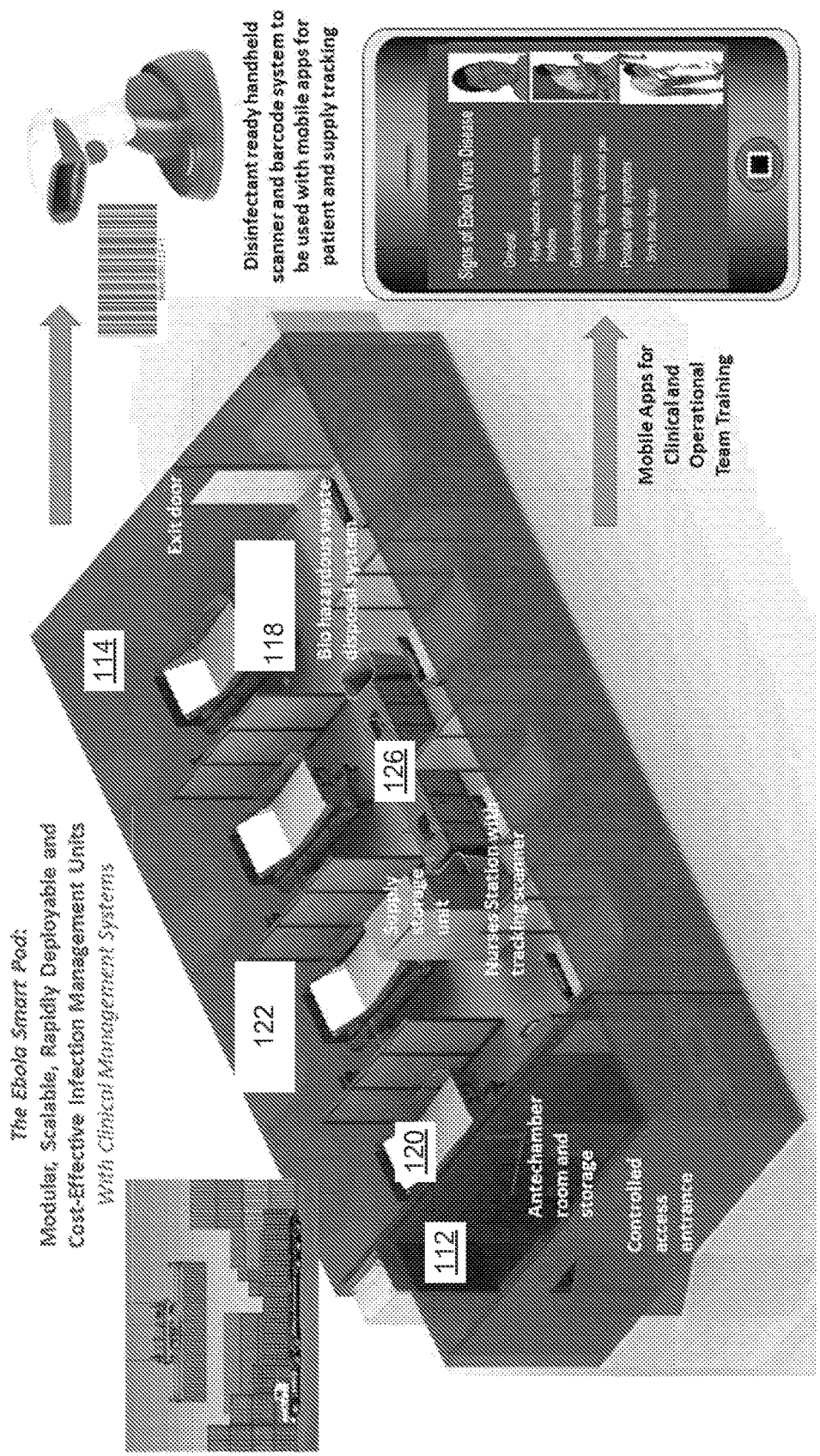
FIG. 2 depicts a perspective view of a mobile clinic according to an embodiment of the invention.
Figure 3A:
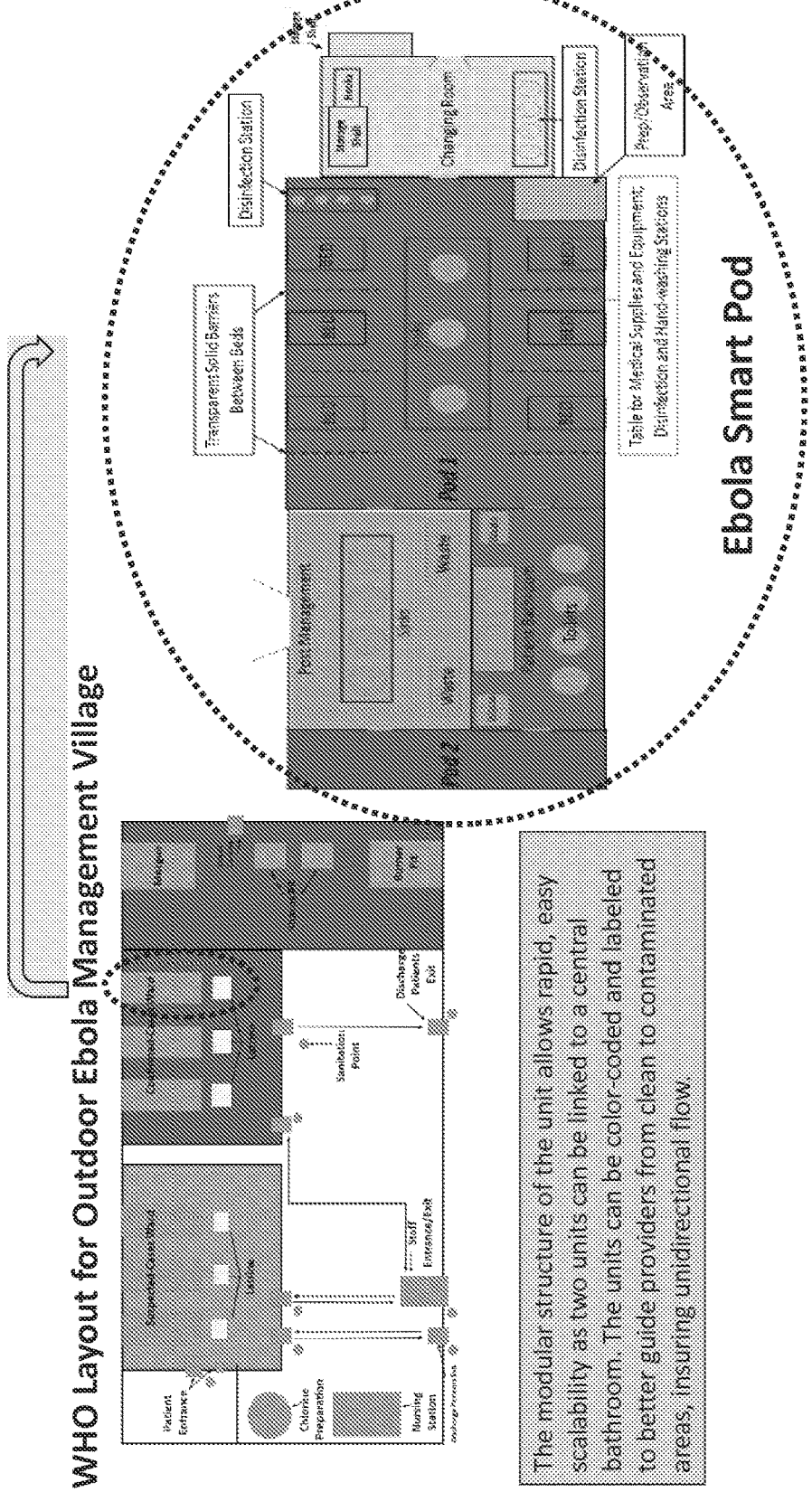
FIGS. 3A and 3B depict a mobile clinic according to an embodiment of the invention and its use in an outdoor Ebola management village.
Figure 3B:
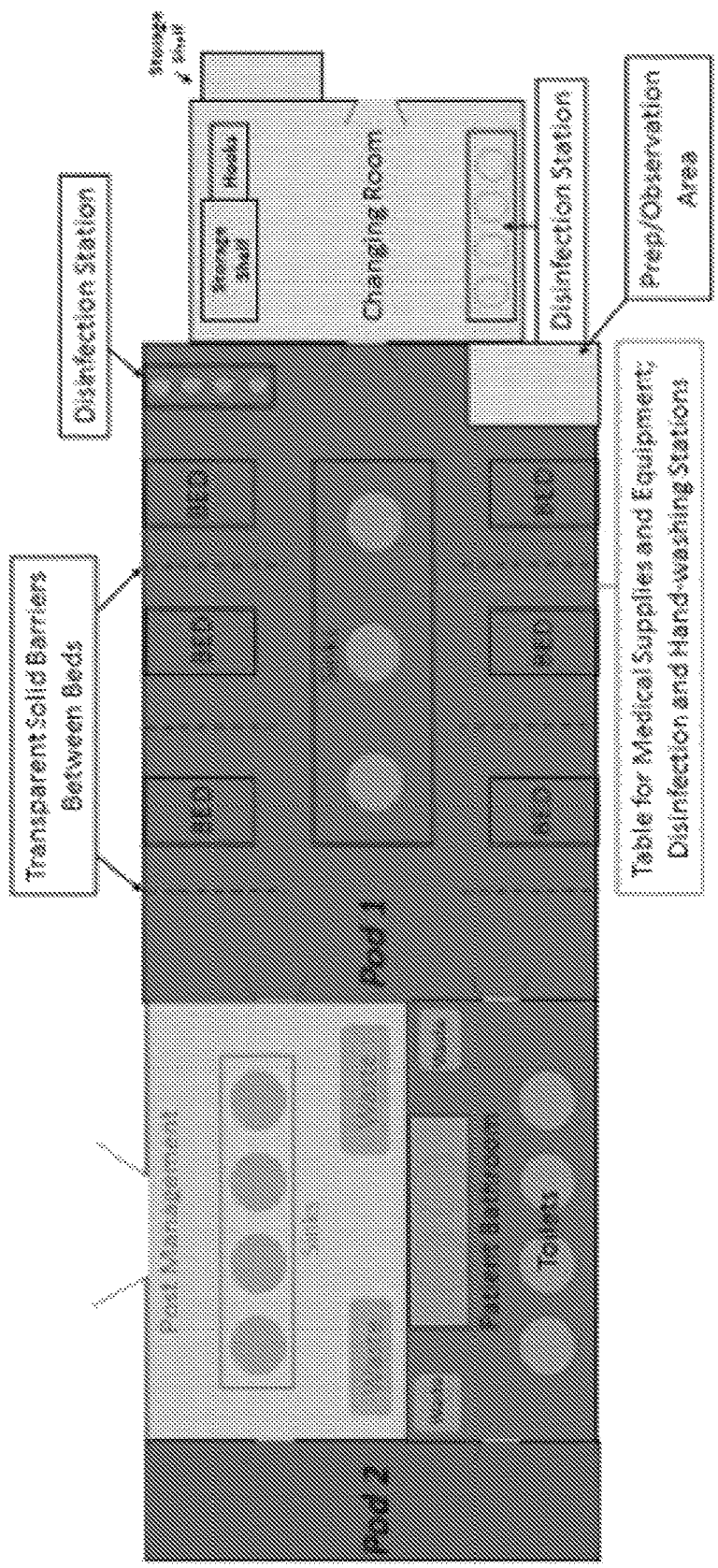
Figure 3C:
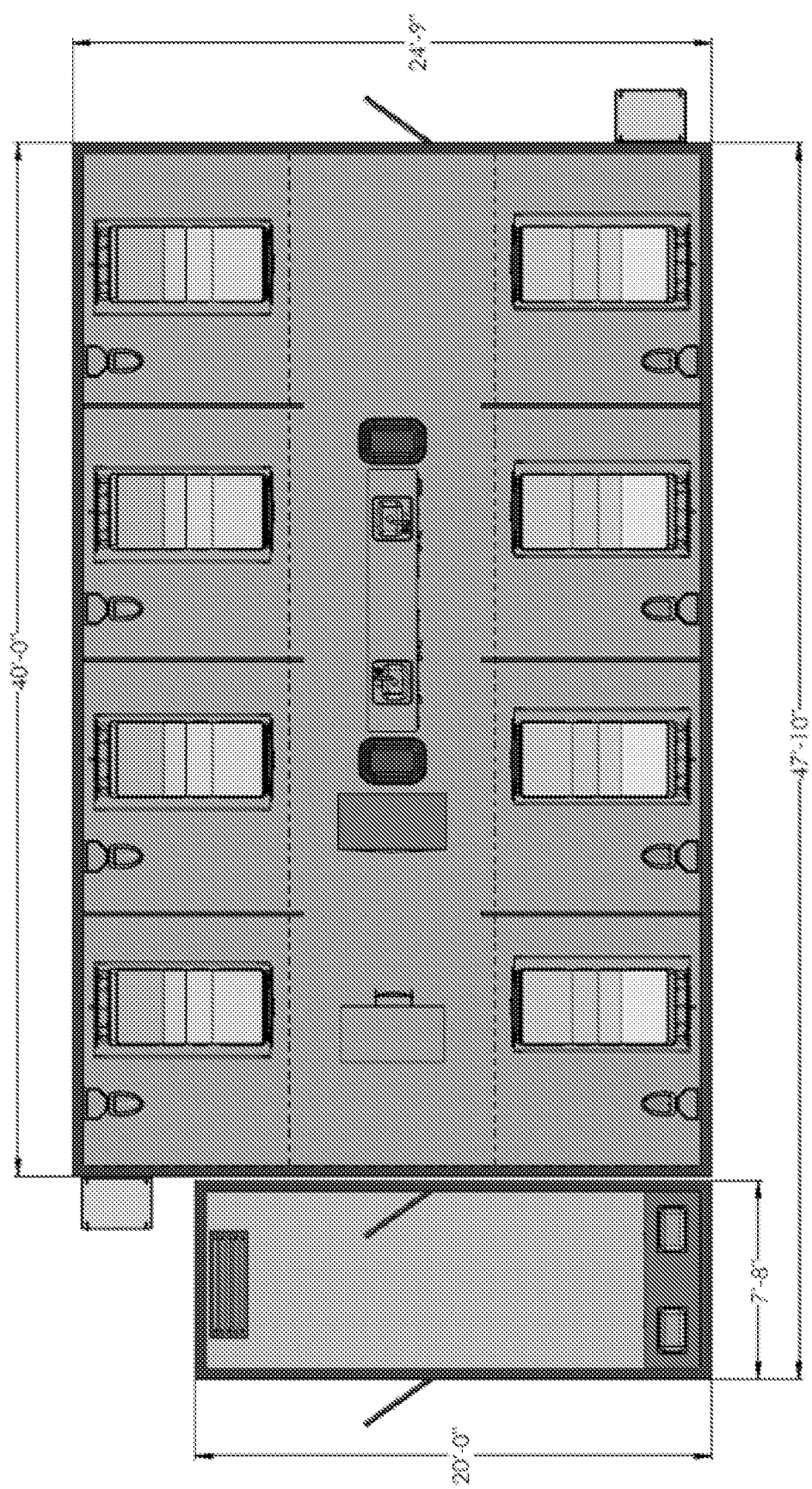
FIG. 3C depicts a horizontal cross-section of a mobile clinic according to an embodiment of the invention.

In some embodiments, one or more the subsystems described herein (e.g., wastewater treatment, HVAC, disinfection, and the like) can be provided in separate intermodal containers can be coupled to the mobile clinic 100 through appropriate conduits. In other embodiments, multiple intermodal containers are placed adjacent to each other to form a single room. In such embodiments, one or more walls of an intermodal container can be removed or removable and can include one or more gaskets or seals. For example, as seen most clearly in FIG. 3C, the embodiments depicted in FIGS. 2-3C utilize three 40' intermodal containers placed side-by-side, with a 20' intermodal container oriented perpendicularly along the short end of the 40' intermodal containers.

Additionally, associated equipment can be located outside of the mobile clinics 100. For example, decontamination showers can be positioned outside of the exit from the mobile clinic 100.

In order to empower and better protect healthcare workers, each mobile clinic can include a standard design to support patient and staff safety, efficient care and standard work processes. Process flows can be used to enhance the modular unit design features. Standard workflows can be a focus of the process design allowing for rapid deployment by decreasing the time necessary to train staff and make units operational. Standard work can be supported by simple, highly visible features, such as color coding of work areas, to prompt unidirectional flow. Process flows can improve efficiency by reducing waste in the process. One example is making supplies readily available where needed and minimizing travel distance to supplies. Including process flows in unit design will serve to increase the time the patient care provider spends in direct patient care activities once the unit is functional.

Aspects of the mobile clinic can include computing devices adapted and configured to execute mobile applications that will use culturally-appropriate caricatures and graphics to provide simple, easily-understood instructions on management and facility use. Exemplary applications include BCM Technology's StepStoneMed™ platform of interactive and memorable virtual patients, which has been shown in a prior prospective trial to be superior to standard lecture format. The software employs a structured learning framework to reinforce clinical pathways, vivid artwork that allows detailed customization, and culturally appropriate aides that can be expanded for community use to dispel myths and misconceptions regarding Ebola that may discourage individuals from seeking care. Additionally or alternatively, an instruction manual can be provided that addresses specific features of the mobile clinic such as cooling, waste disposal, ventilation, and the like.

Although a single mobile clinic is depicted, this mobile clinic can be connected with other mobile clinics or can be connected with existing brick-and-mortar medical facilities. For example, hospitals can utilize a mobile clinic for isolation of patients suspected of infection with deadly diseases.

Collapsible Structures

Figure 5:
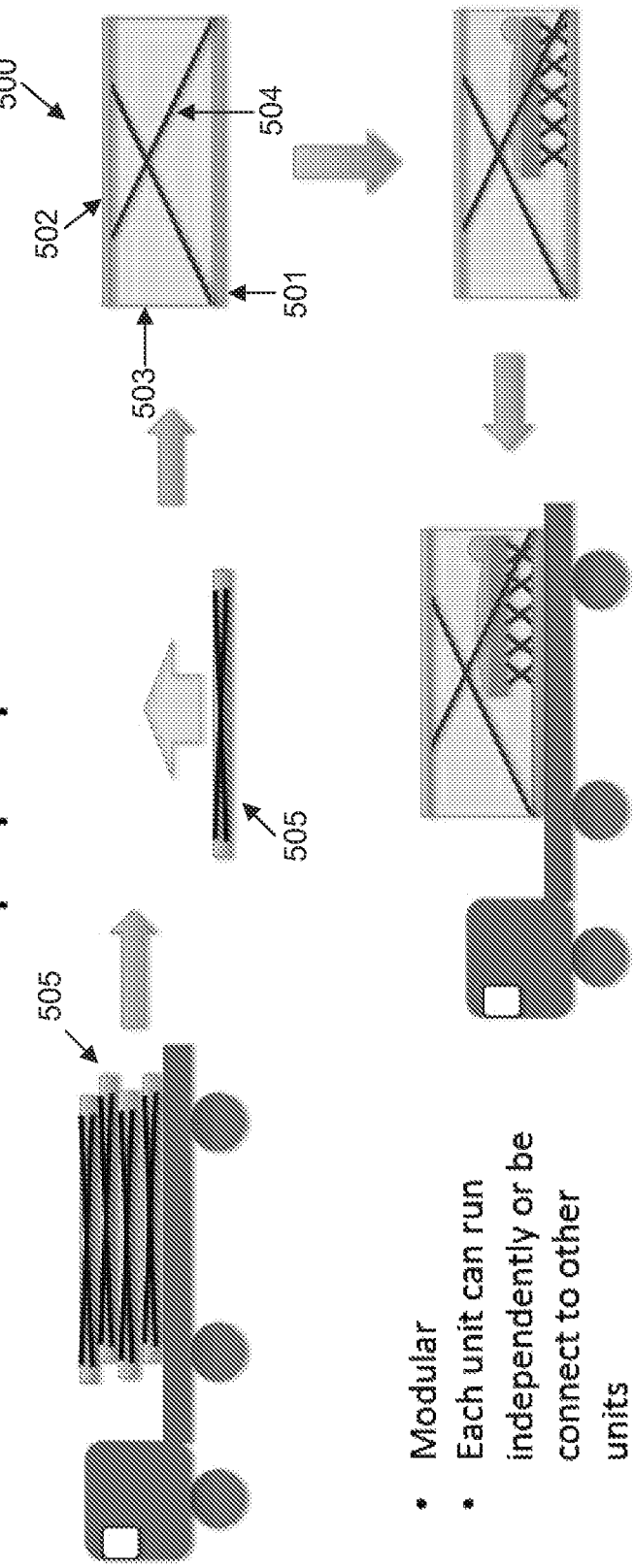
FIG. 5 depicts a collapsible mobile clinic according to an embodiment of the invention and its portable use for transportation.
Figure 8:
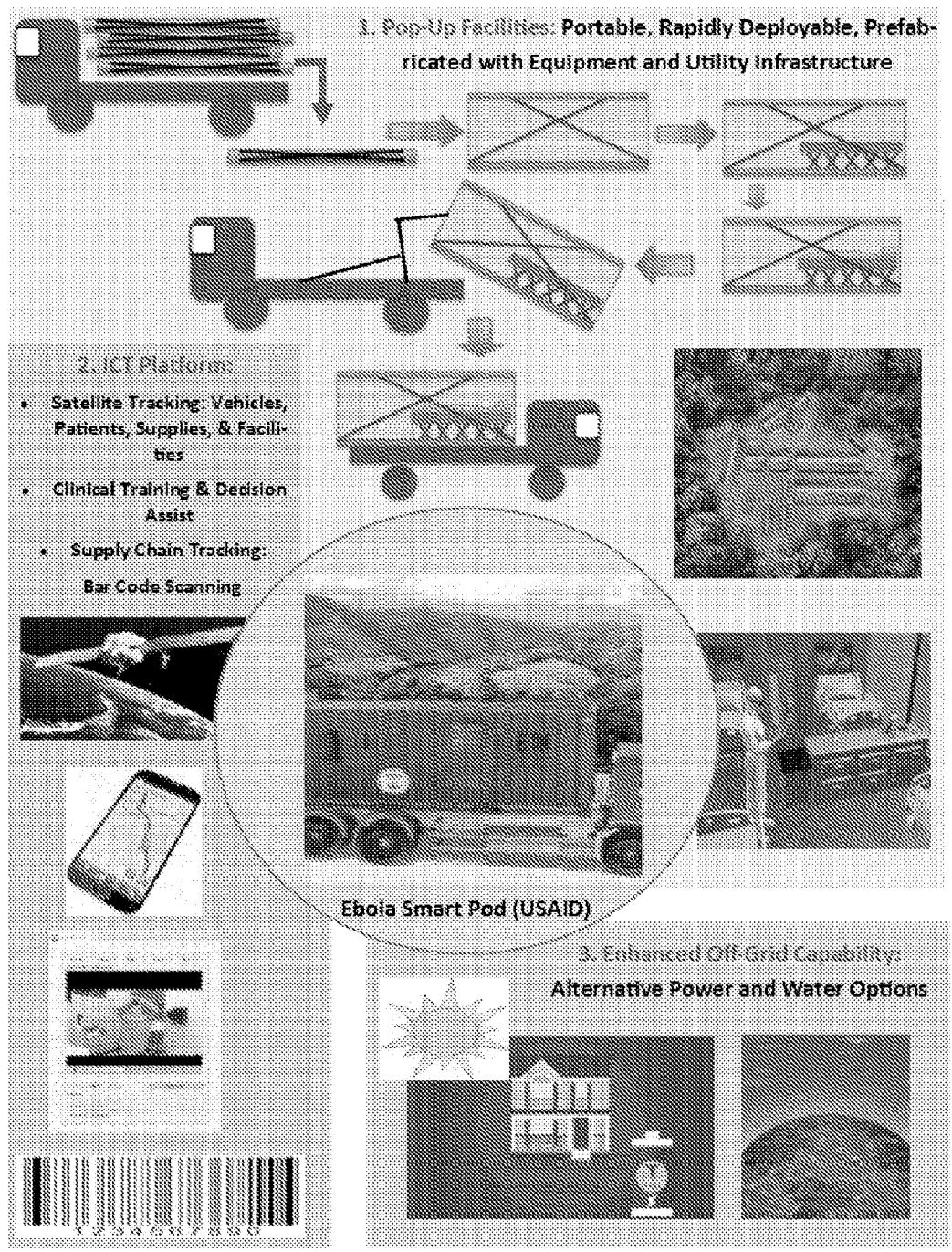
FIG. 8 depicts a collapsible mobile clinic according to an embodiment of the invention and its portable use for transportation, off-grid capabilities for power and water options, and an ICT platform, including screenshots of satellite tracking, a clinical training and decision assist program, patient tracking, supply chain tracking, and bar and QR (Quick Response) code scanning.
Figure 9:
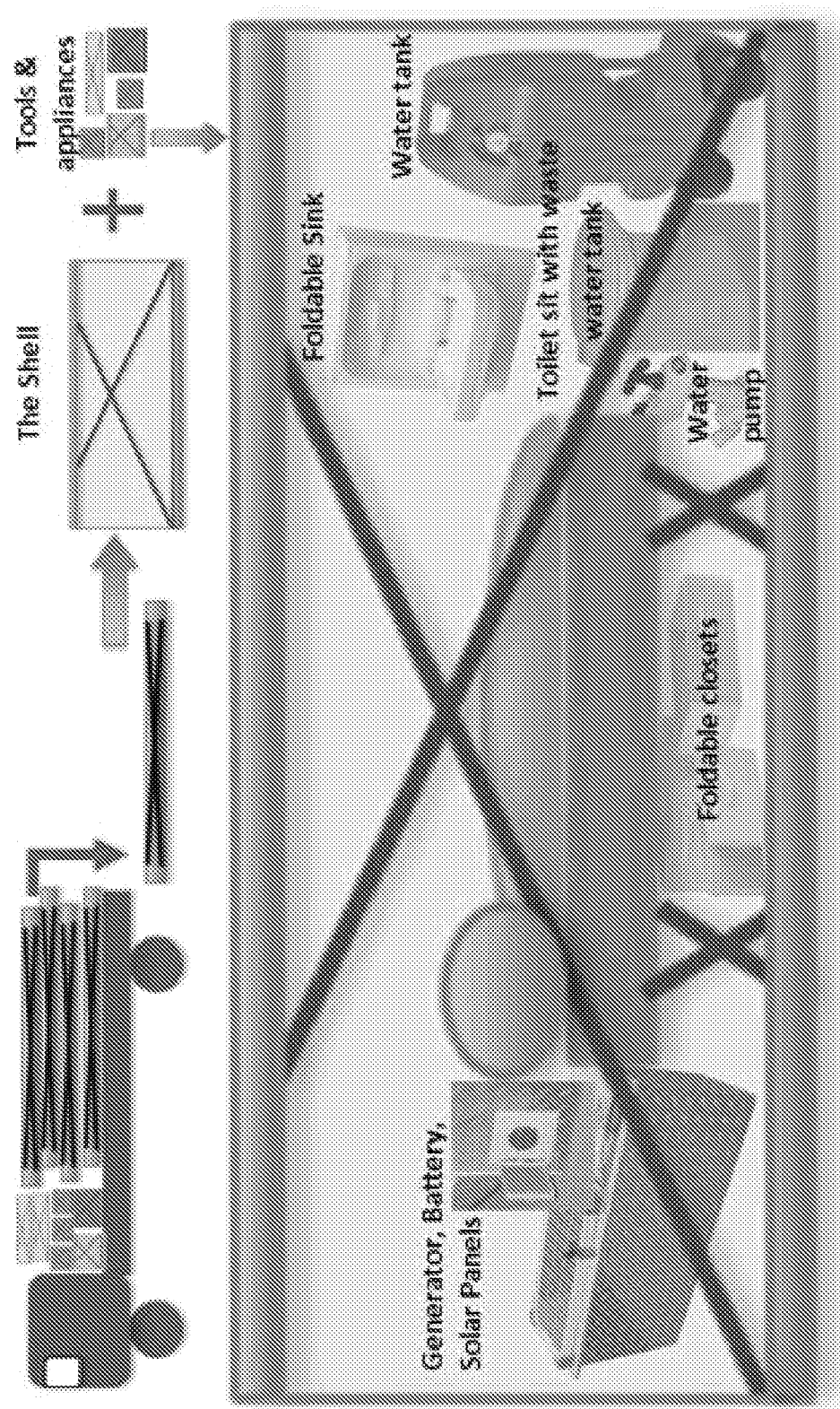
FIG. 9 depicts a collapsible mobile clinic according to an embodiment of the invention and its portable use for transportation, including tools and appliances that can be added inside the collapsible mobile once it is restored to its full size.

Aspects of the invention provide collapsible lightweight structures 500 that can be stacked for quick and efficient deployment (e.g., via truck, airplane, rail, and/or ship), set-up for multifunctionality, and/or prepositioned for use during a time of medical need as depicted, for example, FIG. 8. Referring to FIG. 5, in one embodiment, the collapsible lightweight structures 500 can be used as mobile clinics. The collapsible lightweight structures 500 can have the footprint (i.e., length by width) of a standardized container (also known as a freight container, ISO container, shipping container, hi-cube container, ConEx box, or sea can). Typical lengths include about 20 feet, about 40 feet, about 48 feet, and about 53 feet. Typical widths include about 8 feet. The collapsible lightweight structures 500 can include a one or more openings within one or more flexible walls. For example, a door at one end of a collapsible lightweight structures 500 can constitute the first opening, while a second opening can be a door fabricated within the wall on the opposite end of the collapsible lightweight structures 500. The doors can include various mechanism to achieve a desired seal.

Still referring to FIG. 5, one aspect of the invention provides a collapsible lightweight structure 500 including a rigid base 501, a rigid roof 502, one or more collapsible walls 503 extending between the floor and the base and an erector system including four cross-bars 504.

The rigid base 501 of the collapsible lightweight structure 500 can be made of: wood, metal, wood composite, fiber composite, plastic composite, bamboo mat, vinyl resin, phenolic resin, epoxy resin, unsaturated polyester resin, polyimide resin, and laminate.

The rigid roof 502 can be made of wood, metal, wood composite, fiber composite, plastic composite, bamboo mat, vinyl resin, phenolic resin, epoxy resin, unsaturated polyester resin, polyimide resin, and a urethane polymer.

The collapsible walls 503 can be made of a light-weight material including aluminum, canvas, fabric, woven fabric, netting, water-proof fabric, breathable fabric, textile, mesh, mosquito net, high-density polyethylene fibers (for example, sold under the TYVEK® brand by E. I. du Pont de Nemours and Company of Wilmington, Del.), polyester, high-tenacity polyester, a urethane polymer, and nylon. Further, the collapsible walls 503 can also erect for assembly. The collapsible walls 503 can be fabricated from a material capable of preserving a sterile environment within the structure 500.

The collapsible lightweight structure 500 can have four cross-bars 504 that can be tensioned with a spring mechanism and that can engage with the roof 502 of the collapsible lightweight structure 500 to keep the collapsible lightweight structure 500 in an erect position. The rigid roof 502 or rigid base 501 can include a rail or slide guide adapted and configured to allow for horizontal sliding of the four cross-bars 504. In one embodiment, the four cross-bars 504 can be moved into a desired position by a human or an electric mechanism. In another embodiment, the four cross-bars 504 can have detents within which a portion of the cross-bars 504 can rest as the roof is raised to a fully erect position.

The collapsible lightweight structure 500 can also be stacked and linked to additional collapsible lightweight structures 505. The collapsible structures 505 can be stacked together with pins, angle clips, frame ties, strap ties, braces, brackets, hasps, latches, and hinges. The collapsible structures 505 can be stacked using a stacked pin structure.

The collapsible lightweight structure 500 can be further configured and adapted for linking to a plurality of additional collapsible structures 505. For example, one or more of the collapsible walls 503 can be removed or doors or ports within the one or more collapsible walls 503 can be aligned and mated. The door(s) can include various access control features such as locks.

The collapsible lightweight structure 500 can contain a computing device programmed to receive, input, configure, and/or manipulate data regarding patient health or medical supply usage and transmit the data to one or more locations within and/or outside of the collapsible lightweight structure 500. This data can be used for a variety of purposes including research and development, monitoring and tracking the structure 500, monitoring patients, monitoring supply levels, and the like. The computing device can be further programmed to provide clinical decision support. For example, the computing device can be programmed to support one or more telehealth applications selected from the group consisting of: teleconsulting, telemedicine, and teleseminars.

The structure 500 can also include one or more communications devices adapted and configured to facilitate communications between one or more additional collapsible structures. Such communication functionality can be integrated with the computing device or can be a separate device. The communication device can be support transmission of audio, video, and/or data.

One aspect of the invention provides a collapsible structure 500 including a rigid base 501, a rigid roof 502, one or more collapsible walls 503 extending between the rigid base 501 and the rigid floor, and opposing pairs of cross-bars 504 adapted and configured for engagement with the rigid base 501 and the rigid roof 502, where at least one end of each cross-bar 504 is moveable to an increased angle with respect to the rigid base 501 or the rigid roof 502 in order to raise the rigid roof 502 relative to the rigid base 501.

Structures 500 can be designed and configured to facilitate disease management protocols and principles such as unidirectional flow, color coding of biohazardous and safe areas, and Lean and 5S organizational principles.

In one embodiment, the structure 500 can house a pharmacy and/or a laboratory. Such an embodiment can include access controls, supply (e.g., pharmaceutical) tracking hardware and/or software, onsite testing and drug development equipment, and/or climate control and/or refrigeration equipment. The structure 500 can include appropriate equipment for diagnosing a disease of concern, e.g., Ebola. A pharmacy can include a sterile preparation area for preparing and/or compounding various therapeutics. The therapeutics provided with the structure can be tailored to a disease of concern, e.g., Ebola. In one embodiment, the therapeutics include intranasal antiemetic medications such as those described in Y. Ozsoy and S. Güngör, "Nasal route: an alternative approach for antiemetic drug delivery," 8(11) *Expert Opin. Drug Deliv.* 1439-53 (2011).

Convertible Crates

Figure 6A:
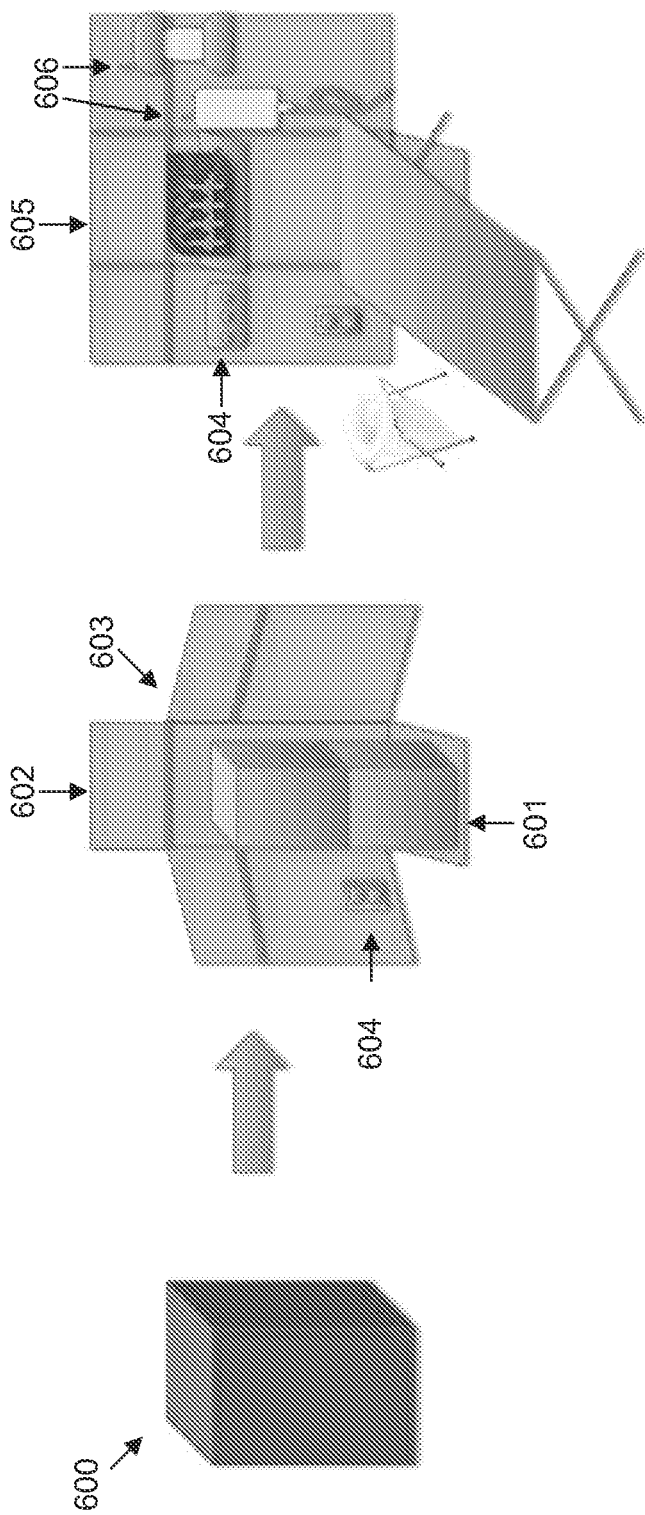
FIG. 6A depicts a crate according to an embodiment of the invention and its use as a prefabricated patient treatment wall.
Figure 6B:
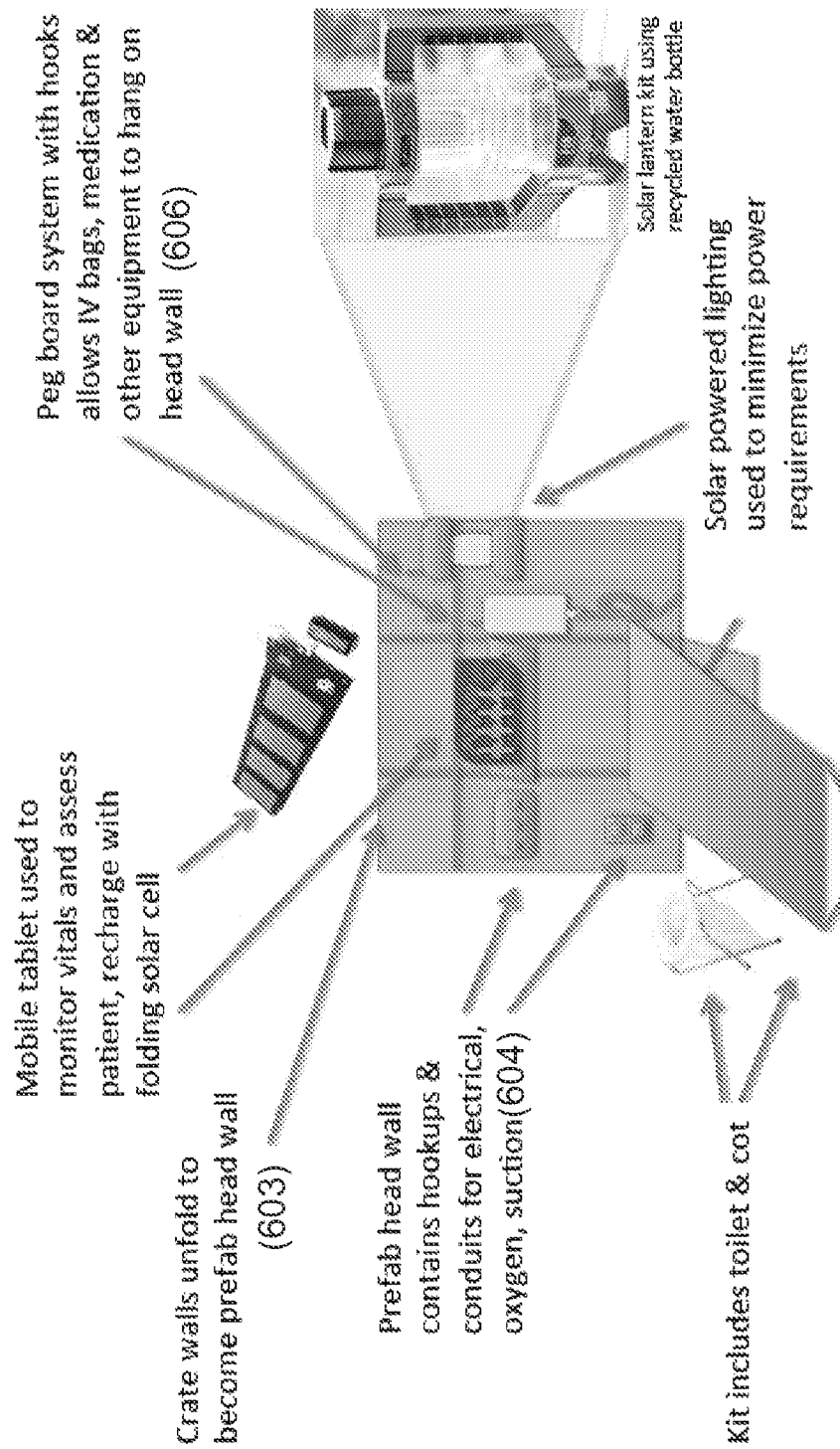
FIG. 6B depicts a prefabricated head wall according to an embodiment of the invention and its use for a patient treatment wall.
Figure 6C:
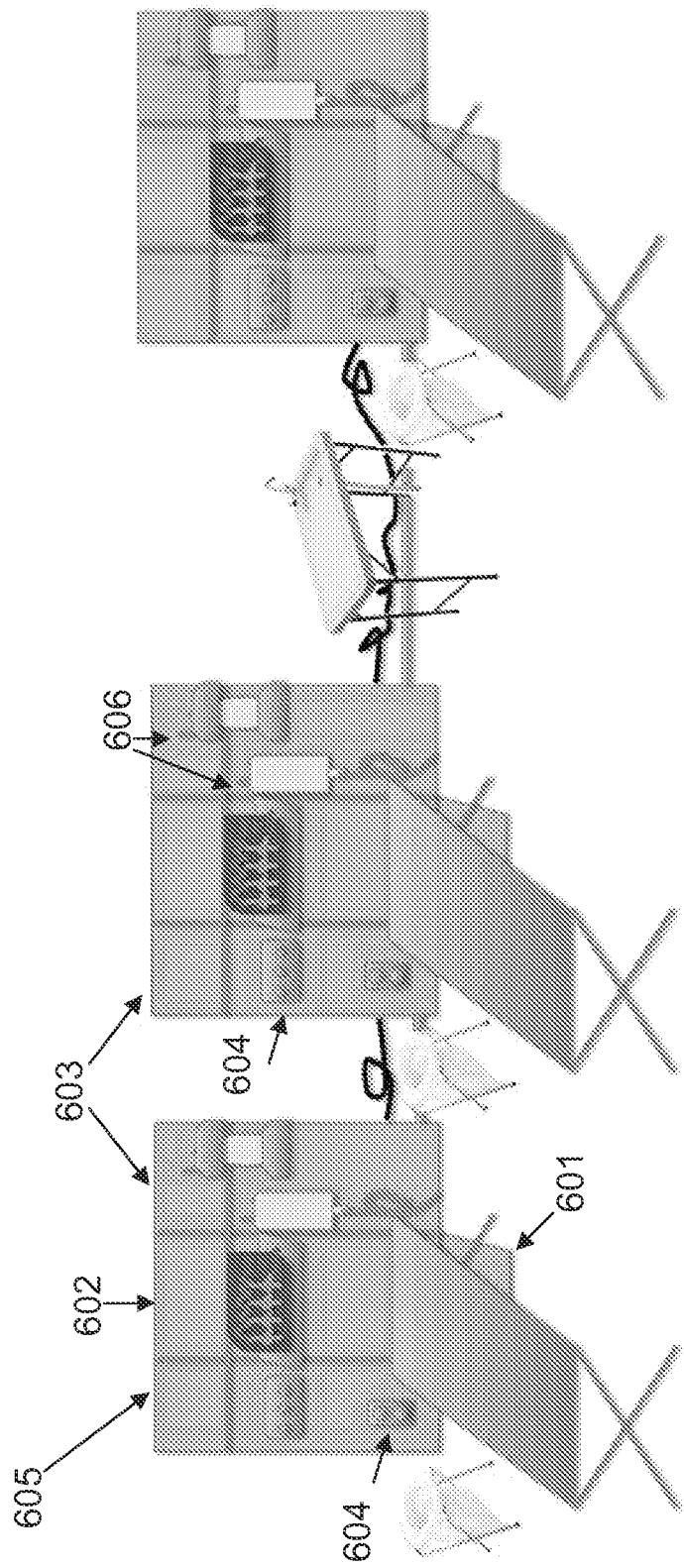
FIG. 6C depicts several prefabricated head wall units linked together according to an embodiment of the invention and their use for patient treatment walls.

Referring now to FIGS. 6A-6C, another aspect of the invention provides a convertible crate 600 containing a bottom panel 601, a top panel 602, and a plurality of walls 603, of which each can include one or more conduits 604. In one embodiment, the crate can including a mobile tablet programmed to monitor vitals and assess patient records.

The walls 603 can engage with each other, the bottom panel 601, or the top panel 602 by a connector including an angle clip, a frame tie, a strap tie, a brace, a bracket, a hasp, a latch, or a hinge. In one embodiment, the walls 603 can also open up to form a patient treatment wall 605. In another embodiment, the walls 603 can open up to the side, drop down, or turn. In yet another embodiment, the bottom panel 601 and the top panel 602 can open up, drop down and turn. In still another embodiment, the walls 603 can include a pegboard or track wall system 606 to hang an intravenous fluid bag, medication, and/or medical equipment.

The conduits 604 can engage with the walls 603 by a gasket or a coupling. In one embodiment the conduits 604 can be configured to support an electrical system, an oxygen system, a suction system, and/or a lighting system.

The conduits 604 can be linked with additional patient treatment walls. The conduits 604 can further be configured to transmit gas, fluid, or electricity from the bottom panel 601 to the top panel 602 or among the walls 603.

The convertible crate 600 can be loaded with equipment. In one embodiment the equipment can be medical equipment, supplies, water tanks, water pumps, solar arrays, computer devices, toilets, foldable closets, collapsible tables, collapsible sinks, collapsible lights, or collapsible trash cans.

Solar Water Purification System

Figure 7A:
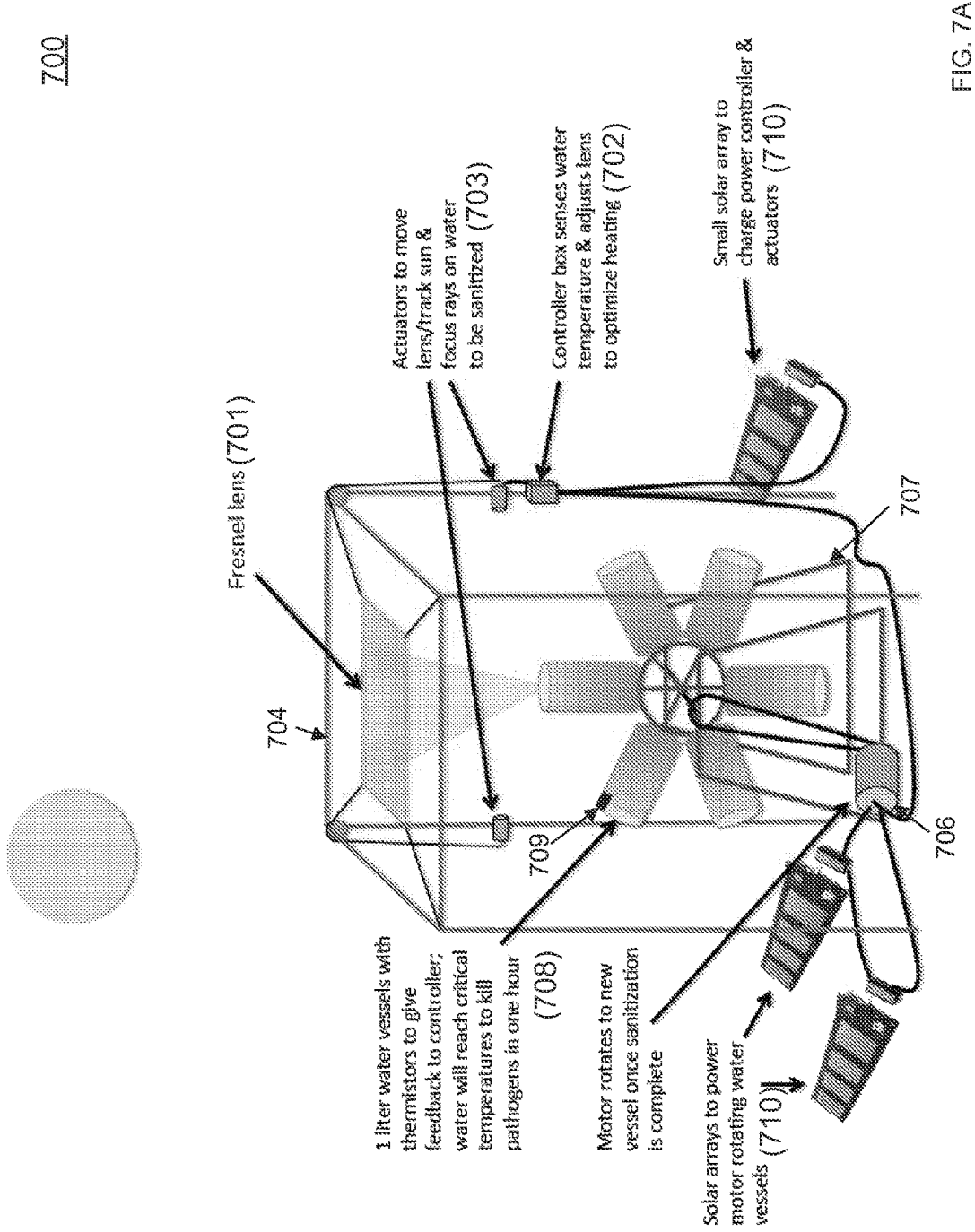
FIGS. 7A and 7B depict a solar water sanitizing system according to an embodiment of the invention.
Figure 7B:
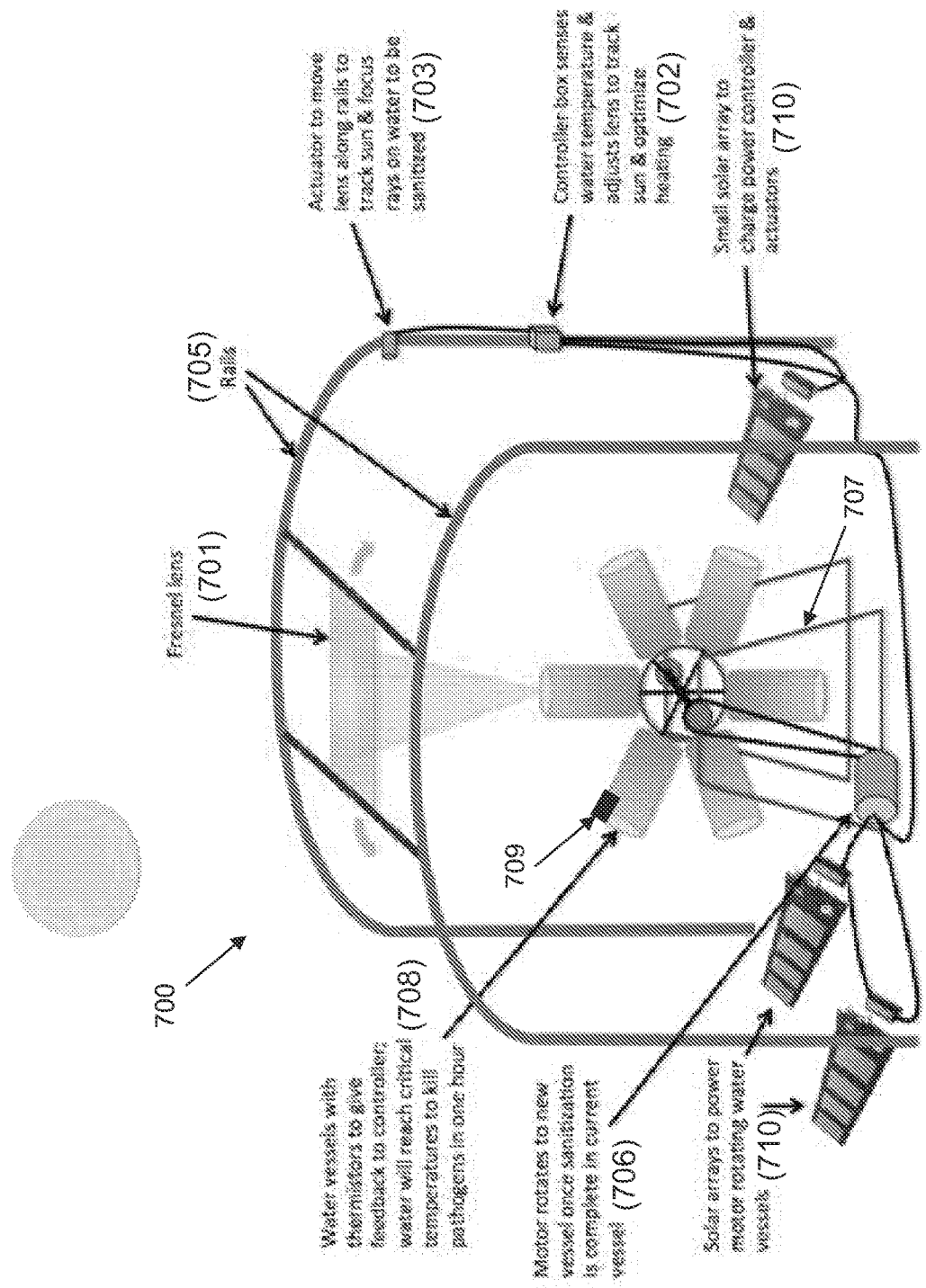

Referring now to FIGS. 7A and 7B, another aspect of the invention provides a solar purification system 700 including a moveable Fresnel lens 701, a controller 702, and an actuator 703 that can move the Fresnel lens 701 to track sunlight and direct the sunlight to a designated location.

In one embodiment, the solar purification system 700 further includes a frame 704 that can hold the moveable Fresnel lens 701, the controller 702 and the actuator 703. In another embodiment, the Fresnel lens 701 is mounted on one or more rails 705.

In still another embodiment, the solar purification system 700 contains one or more sealed water containers 708. The sealed water containers 708 can include a thermistor 709 programmed to sense temperature. The thermistor 709 can measure temperature inside a sealed water container 708 and communicate a measured temperature to a controller 702. The controller 702 can be programmed to receive water temperature measurements from the thermistor 709 and control the actuator 703 to adjust the Fresnel lens 701 to track sunlight and optimize heating.

In another embodiment, an external thermometer can be utilized to display the temperature outside the containers 708. For example, a photochromic thermometer could be mounted to the outside of a container 708 or an internal wall of a container having a transparent or translucent wall.

The thermistor 709 can facilitate heating water to a target temperature sufficient to kill pathogens of concern. Without being bound by theory, suitable temperatures include about 130, 131, 132, 133, 134, 135, 136, 137, 138, 139, 140, 145, or 1500 Fahrenheit. One of ordinary skill in the art will appreciate that the desired temperature can be modified based the duration of heating and pressure applied to the water.

The containers can be made from a variety of materials and in a variety of colors. In one embodiment, the containers are black to maximize absorption of light directed by the Fresnel lens 701.

In one embodiment, a motor 706 is mounted inside a stand 707 below the Fresnel lens 701. The motor 706 can rotate a plurality of sealed water containers 708 to replace a new sealed water container 708 in place of a treated sealed water container 708. The motor 706 can rotate a wheel, a ring, a conveyer belt, or a surface in linear or circular motion.

In one embodiment, the solar purification system 700 contains solar arrays 710 that can charge at least one of the controller 702, the thermistor 709, the motor 706, the actuator 703, and a power storage device (e.g., a battery).

The solar purification system 700 can be collapsible.

The solar purification system 700 can include a reusable filter that can pretreat water and eliminate large particulates.

Applications of Inventions

Embodiments of the inventions can be utilized both for provision of routine medical care including primary care visits, surgical/non-surgical procedures (e.g., endoscopic procedures, obstetric/gynecologic procedures, and the like), patient/community education, and the like. Additionally, embodiments of the invention are particularly useful for treating patients diagnosed with or suspected of affliction with an infectious disease such as Ebola; dengue fever; hand, foot, and mouth disease; measles; cholera; influenza; meningitis; mumps; hepatitis A, B, or C; bubonic plague; Poliomyelitis; Chikungunya; malaria; yellow fever; leishmaniasis; SARS coronavirus; and the like. Embodiments of the inventions can also be used in rapid response emergency situations such as in response to natural disasters, terrorist attacks, wars, biological attacks, chemical attacks, humanitarian crises, and the like.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A collapsible structure comprising:
   a rigid planar base;
   a rigid planar roof having a substantially identical cross-sectional dimension as the rigid planar base;
   one or more collapsible walls extending between the rigid planar roof and the rigid planar base; and
   an erector system comprising four cross-bars extending between the rigid planar roof and the rigid planar base, wherein the four cross-bars are configured to engage with the rigid planar roof and the rigid planar base to keep the collapsible structure in an erect position.

2. The collapsible structure of claim 1, wherein the four cross-bars are tensioned with a spring mechanism.

3. The collapsible structure of claim 1, wherein the rigid roof or rigid base includes a rail or slide guide adapted and configured to allow for horizontal sliding of the four cross-bars.

4. The collapsible structure of claim 1, further configured and adapted to be stacked on a plurality of additional collapsible structures.

5. The collapsible structure of claim 1, further configured and adapted for linking to a plurality of additional collapsible structures.

6. The collapsible structure of claim 1, further comprising:
   one or more communications devices adapted and configured to facilitate communications between one or more additional collapsible structures.

7. A collapsible structure comprising:
   a rigid planar base;
   a rigid planar roof having a substantially identical cross-sectional dimension as the rigid planar base;
   one or more collapsible walls extending between the rigid planar base and the rigid planar roof; and
   opposing pairs of cross-bars adapted and configured for engagement with the rigid planar base and the rigid planar roof;
   wherein at least one end of each cross-bar is:
      moveable to an increased angle with respect to the rigid planar base or the rigid planar roof in order to raise the rigid planar roof relative to the rigid planar base; and
      configured to engage with either the rigid planar base or the rigid planar roof to keep the collapsible structure in an erect position;
   wherein at least one of the rigid planar base and the rigid planar roof comprise a rail or a slide guide adapted and configured to allow for horizontal sliding of the opposing pairs of cross-bars.

* * * * *